United States Patent [19]
Killgoar, Jr. et al.
[11] Patent Number: 5,008,324
[45] Date of Patent: Apr. 16, 1991

[54] NOVEL DAMPING COMPOSITIONS

[75] Inventors: Paul C. Killgoar, Jr., Livonia; Marsha A. Samus, Ann Arbor, both of Mich.; Robert D. Koller, Sr., Valbonne, France; Carl P. Hemenway, Glenside, Pa.

[73] Assignee: Rohm and Haas Company, Philadelphia, Pa.

[21] Appl. No.: 336,187

[22] Filed: Apr. 11, 1989

[51] Int. Cl.[5] .......... C08K 3/34; C08L 51/00; F16F 1/36; F16F 7/12

[52] U.S. Cl. .......... 524/504; 267/153; 267/292; 524/526; 525/86

[58] Field of Search .......... 525/86, 903; 524/526; 262/153

[56] References Cited

U.S. PATENT DOCUMENTS

| | | | |
|---|---|---|---|
| 4,180,529 | 12/1979 | Hofmann | 525/80 |
| 4,419,480 | 12/1983 | Tabar et al. | 524/528 |
| 4,468,499 | 8/1984 | Siegfried et al. | 525/903 |
| 4,717,750 | 1/1988 | Makati et al. | 525/902 |

OTHER PUBLICATIONS

Abstract, Japanese Patent 62-116316, 5/87, Shirohige et al.

Abstract, Japanese Patent 62-164761, 7/87, Kotzumi et al.

*Primary Examiner*—Allan M. Lieberman
*Attorney, Agent, or Firm*—Roger K. Graham

[57] ABSTRACT

A process of using compositions comprising certain thermoplastic elastomeric polymers for damping and damping compositions comprising soft thermoset polymer containing microscopically discrete segments of said thermoplastic elastomeric polymers.

10 Claims, No Drawings

NOVEL DAMPING COMPOSITIONS

BACKGROUND OF THE INVENTION

1. Field of the Invention

This invention relates to the use of a certain multiphase, thermoplastic elastomeric polymer for damping purposes, and new damping compositions comprising said polymer.

2. Description of the Prior Art

Lorentz et al., pps. 306–329, in Piirma and Gardon, ed., "Emulsion Polymerization", American Chemical Society Symposium Series 24, Washington, D.C., 1976, and Sperling, pps. 21–56, in Paul and Sperling, ed., "Multicomponent Polymeric Materials", American Chemical Society Symposium Series 211, Washington, D.C., 1986, have discussed in detail the damping properties of two-phase emulsion polymers of varying composition wherein the second polymer is polymerized in the presence of the first.

Lohr, U.S. Pat. No. 3,430,902 teaches a vibration damping device comprising a solid, high molecular weight amorphous polymer utilized at or near its glass temperature combined with means for heating or cooling so that the glass temperature is approximately that of the use temperature of the vibration support.

Tabar et al. U.S. Pat. No. 4,362,840 and U.S. Pat. No. 4,419,480; Lemieux et al., Rubber Chem. Tech., 57, 792 (1984); Mazich et al. ibid., 59, 623 (1986) teach soft compositions useful as low modulus, high damping, high fatigue life elastomer compounds for vibration isolation. The compounds are cured, vulcanized, or crosslinked blends of natural rubber with bromobutyl rubber to which has been added a non-vulcanizable polyisobutylene which remains in a discrete phase after cure; a particulate additive such as carbon black is also incorporated. These two patents also teach the use of synthetic poly(isoprene) or polybutadiene in similar blends to improve the heat resistance of the blend.

Falk et al, U.S. Pat. No. 4,473,679, claim thermoplastic core-shell compositions having a rigid core surrounded by a rubbery acrylic partially encapsulating layer, with a copolymeric transition layer formed from the mixture of monomers used to prepare the core and shell layer.

Makati et al, U.S. Pat. No. 4,717,750 and U.S. Pat. No. 4,742,108; Lee et al., U.S. Pat. No. 4,569,964 teach reinforced latex particle structures. The Makati et al. patents teach a second phase of glass temperature higher than either the first or third phase.

Hofmann, U.S. Pat. No. 4,180,529, teaches a four-phased emulsion polymer having a non-elastomeric second phase which may contain up to 5% of a crosslinking monomer in combination with a elastomeric first phase. Owens, U.S. Pat. No. 3,793,402 teaches a similar staging with an additional thermoplastic outer phase.

The Derwent abstract of Japanese Patent No. 79-8497 teaches blends of liquid thermosetting resins with rubbery polymers and linear thermoplastic resins as vibration-reducing materials useful at high temperature and flexible at ordinary temperature.

The Derwent abstract of Japanese Patent No. 88-1979 teaches blends of natural rubber with a soluble chloromethylstyrene-butadiene-styrene terpolymer as a useful high modulus elastomeric product.

Frankel et al. European Patent Application No. 187,505, published July 16, 1986, and U.S. Pat. No.

4,184,373, granted Mar. 21, 1989 teach two-phase polymers used in the present invention.

Sugii et al. (Nitto Electric) in Japanese Kokai No. 60-92372 teach a polymer useful as an improved pressure sensitive adhesive by first polymerizing a (meth)acrylic polymer which produces a tacky material, adding a monomer mixture enriched in a multifunctional monomer, along with an organic peroxide, to swell the particles and conducting the polymerization of the second monomers at an elevated temperature.

SUMMARY OF THE INVENTION

The present invention is directed to a process which comprises using a certain multi-phase thermoplastic elastomeric polymer for damping, i.e., as a damping material. The multi-phase polymer has at least two polymeric phases: (a) an initial (i.e. first) linear or lightly crosslinked polymeric phase polymerized from an $\alpha$, $\beta$ ethylenically unsaturated monomer, wherein the $\alpha$, $\beta$ ethylenically unsaturated monomer comprises from about 0 to 2% by weight of multi-ethylenically unsaturated monomer, and (b) a second polymeric phase in the form of discrete domains of about 2 to about 15 nm in diameter dispersed within the initial polymeric phase, wherein the second polymeric phase is polymerized from at least one ethylenically unsaturated monomer comprised of about 5% to 100% by weight multifunctional monomer having at least two sites of ethylenic unsaturation. The weight ratio of the second polymeric phase to the initial polymeric phase plus said second polymeric phase is from about 1:100 to about 1:2. The multi-phase polymer may further comprise a final (i.e., third) polymeric thermoplastic phase whose glass transition temperature is greater than that of the initial polymeric phase, a portion of the final polymeric phase being intimately attached to at least one of the initial or second polymer phases.

According to another aspect of this invention, it is directed to a composition used for damping which comprises: (a) soft crosslinked elastomer containing (b) microscopically discrete segments of the multi-phase, thermoplastic elastomeric polymer disclosed above. The elastomer is crosslinked with (d) curative in an amount sufficient to crosslink the elastomer.

According to another aspect of the invention, it is directed to the use of such composition for damping purposes.

An object of the present invention is the use of a multi-phase polymer of certain morphology which exhibits excellent damping behavior over a broad temperature range.

Another object of this invention is the combination of these multi-phase polymers as microscopically discrete segments with a thermosettable or vulcanizable elastomer or elastomer blend to yield a composition having excellent damping, good resistance to fatigue failure, and resistance to creep. It is a further object to provide such compositions which are readily processible and remoldable. It is a further object to provide a damping composition which provides outstanding damping performance over a wide range of use temperatures. It is a further object to provide such compositions as useful damping elements for vibration isolation in computers, motors, automotive and truck components, such as steering column connectors, power generators, or rubber sheeting for vibration isolation of computers, audio equipment, and the like.

These objects and others as will become apparent from the following disclosure are achieved by the present invention.

DETAILED DESCRIPTION OF THE INVENTION AND THE PREFERRED EMBODIMENTS

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measure of damping is the determination of a parameter called tan $\delta$. A forced oscillation is applied to a material at frequency f and the transmitted force and phase shift are measured. The phase shift angle delta is recorded. The value of tan $\delta$ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan $\delta$ vs. frequency by curve alignment. An alternate method is to measure tan $\delta$ at constant frequency (such as at 10 hz) over a temperature range.

We have defined a thermoplastic unfilled material as useful for damping when tan $\delta > 0.4$ over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The thermoplastic elastomeric polymers described by Frankel et al, U.S. Ser. No. 683,902, filed 12/20/84, continuation application Ser. No. 92,816 filed 9/3/87, are useful in the process and compositions of this invention. This reference is hereby expressly incorporated by references for such teachings.

Also useful in the present invention are three-phase polymers in which up to about 20% by weight of a third or of a final phase is polymerized in the presence of two-phase polymers as described by Frankel et al. The final polymeric thermoplastic phase is selected to have a glass temperature greater than that of the initial polymeric phase, and a portion of the final polymeric phase will be intimately attached to the initial and/or the second polymer phases.

The first phase polymer may contain small amounts, up to about 10%, of certain polar or functionalized monomers. Preferred are acids, such as acrylic, methacrylic, isoascorbic, maleic, fumaric, and the like or nitrile-containing monomers, such as acrylonitrile, methacrylonitrile, beta-cyanoethyl acrylate, and the like. Especially preferred is acrylic acid in amounts from about 2 to about 4 percent. Also especially preferred is acrylonitrile in amounts from about 2 to about 7 percent.

It is also preferred that the molecular weight of the first phase be high. Use of mercaptan to lower molecular weight of the first phase should be avoided. Polymerization at low temperatures, such as below about 65°, is preferred.

It may be desirable to lower the glass temperature of the first phase polymer. Such may be accomplished by lowering the amounts of lower alkyl methacrylate copolymerized or by use of an acrylate monomer with a longer side chain, such as 2-ethylhexyl acrylate. The third phase polymers preferably contain mers which are predominately (meth)acrylic esters, and the hardness of the third phase may be controlled by the nature of the copolymer formed. It is preferred that the polymer be about at least 50% lower alkyl methacrylate to about 100% lower alkyl methacrylate, the lower alkyl methacrylate being preferably methyl methacrylate, and from about 0 to about 50% of one or more lower alkyl acrylates. Other monomers, such as styrene, other alkyl methacrylates, other alkyl acrylates, acrylonitrile, etc., may be present in amounts up to about 20%. Specific functionalized monomers, such as acrylic acid, methacrylic acid, acryloxypropionic acid, dimethylaminoethyl methacrylate, and the like, may be present in amounts up to about 5% of the third phase monomer mixture, as also may be monomers useful in promoting adhesion to metal, wood, glass, or polymeric substrates, such as those containing ureido or glycidyl functionality.

It is preferable that little or no new emulsifier be added during the formation of the third phase polymer. Initiators as taught in Frankel et al. may be utilized. It may be desirable to incorporate a chain transfer agent with the third phase monomers. Preferred are primary, secondary or tertiary alkyl mercaptans, especially longer alkyl mercaptans, such as n-dodecyl or t-dodecyl. Other mercaptans, such as thioglycolate or mercaptopropionate esters, may be used, as may other well-known transfer agents such as bromotrichloromethane. Such may be added directly with the third phase monomers or separately before or during the third phase polymerization.

The polymer emulsion may be agglomerated or aggregated by techniques described in the literature so as to increase the particle size. Such agglomeration may be accomplished by pH adjustment, by partial coagulation, and the like. Agglomeration may be accomplished prior to or after final staging.

Particulate fillers such as carbon black, mica, talc, and the like may be introduced into the multi-phase polymers at either the extrusion/isolation step or the isolated polymer may be re-processed to incorporate the filler, by means such as milling on a two-roll mill. Levels of filler may be as high as about 40%. Preferably such particulate fillers are reinforcing particulate fillers.

The multi-phase polymers may be converted into articles useful for damping by known molding or extrusion techniques. Both injection molding and compression molding may be employed. Useful articles include solid supports, gaskets, bushings, interliners, and the like.

These multi-phase polymers are also described herein as thermoplastic elastomeric polymers, as they are both thermoplastic, in that they can be molded and re-processed as true thermoplastics, yet exhibit an elastomeric response to stress, as well as the noted absorption of mechanical energy.

In addition to their use in their own right as articles useful for damping, the multi-phase polymers may be combined into thermoset elastomer(s) systems (i.e., elastomer, curative, fillers, etc.) to enhance damping performance thereof. The resulting thermoset compositions are fatigue resistant and may be shaped during the curing process into useful articles, such as gaskets, motor mounts, bushings, sheets, and the like. Such compositions are especially useful in damping vibration from motors, engines, and other mechanical components, as well as vibrations resulting from vehicular or other motion in buildings, electronic and mechanical equipment, and the like. They are especially useful in situations where heat and repeated vibration can cause fatigue impairment of the long-term properties of other elastomer. The acrylic multi-phase polymers are especially useful in their resistance to heat and oxidative degradation and oil swelling. Where heat resistance of the composition is desired, polymers of butadiene are preferably included in the composition as a crosslinkable elastomer.

The thermoset elastomers may be based on any of a number of crosslinkable elastomers, such as polymers or copolymers of butadiene, ethylene-propylene-diene terpolymers, acrylic ester copolymers containing cure sites, polymers of isoprene, polymers of isobutylene containing unsaturation for curing, curable urethane elastomers, polymers from chloroprene monomer, and the like. Preferred are bromobutyl rubber, elastomeric polybutadiene, and polyisoprene; especially preferred are blends of natural or synthetic polymers of isoprene with bromobutyl rubber in ratios of from about 10/90 to about 90/10 parts by weight.

The Tabar et al. patents teach curatives, fillers, and the like and methods for combining the materials of the crosslinkable elastomer systems, curing same, and physical testing thereof. These patents are hereby expressly incorporated by reference for such teachings. In those patents, strain crystallizable isobutylene polymers are taught as softening materials when added in fatigue enhancing amounts. The formulations and techniques for processing such systems are directly applicable to those used for the processing of composition comprising curable rubber with the thermoplastic multi-phase acrylic polymers of the present invention, except for the replacement of the polyisobutylene. Thus, a preferred amount of thermoplastic multi-phase polymer included in the natural rubber/bromobutyl rubber blends is from about 10 parts to about 40 parts per 100 parts of crosslinkable elastomer blend. An especially preferred amount is from about 10 to 30 parts of multi-phase polymer per 100 parts of crosslinkable elastomer.

The crosslinkable elastomer may preferably be crosslinked by a curative comprising a curing agent selected from the group consisting of: (a) a sufficient amount of sulfur to provide an efficient or semi-efficient crosslinking of the soft thermoset composition; (b) isocyanate or blocked isocyanate in an amount sufficient to crosslink the elastomer. The use of sulfur is especially preferred.

EXAMPLES

The examples are intended to illustrate the present invention and not to limit it except as it is limited by the claims. All temperatures are in degrees Celsius. All percentages are by weight unless otherwise specified, and all reagents are of good commercial quality unless otherwise specified.

Standard procedures are used to characterize the emulsions. Particle sizes are determined by a quasielastic light scattering technique using a Nano-Sizer* particle size analyzer manufactured by Coulter Electronics Inc. The procedures used to determine soluble fraction and gel swell ratio as given below.

The soluble fraction and gel swell ratio are polymer characteristics which are determined using acetone as the solvent. A known weight of polymer (either as the emulsion or as the isolated polymer) is placed in a centrifuge tube along with about 50 times the polymer weight of acetone (e.g., 0.5 g of polymer in 25 g acetone in a 50 ml. tube). After shaking, usually overnight, the sample is centrifuged (20,000 rpm for 60–90 min.) to precipitate the insoluble gel. The clear supernate is removed and dried to determine soluble polymer. The gel is redispersed in acetone for at least 4–6 hours and centrifuged again. The clear supernate is removed and dried as before. If the second extraction gives more than about 5% soluble fraction, the extraction is repeated until less than about 5% is found in the supernate. The weights of the polymer in the soluble fractions are summed and the percent soluble fraction is calculated as (weight of soluble polymer/total polymer weight)×100.

After the last extraction, the weight of the acetone swollen gel is determined and the gel swell ratio calculated as weight of wet gel divided by (total polymer weight−soluble polymer weight).

All milling and molding for Examples 1–6 were performed at 177° C. The tensile and elongation measurements were performed according to ASTM-D-882; the Tg measurements according to ASTM-D-3418-75 on a Perkin-Elmer DSC-2.

The following abbreviations are used in certain portions of the examples: BA=butyl acrylate; EA=ethyl acrylate; AA=acrylic acid; MAA=methacrylic acid; AN=acrylonitrile; MMA=methyl methacrylate; BGDMA=1,3-butyleneglycol dimethacrylate; BMA=butyl methacrylate; IM=polyisobutylene; St=styrene; BR=elastomeric poly(butadiene); NR=natural rubber.

EXAMPLE 1

Preparation of a Two-Phase Polymer with Five Parts of a Second Cross-Linked Phase A monomer emulsion was prepared of the following ingredients:

| | |
|---|---|
| Water | 435 g |
| Sodium lauryl sulfate (28%) | 27.7 g |
| Butyl acrylate | 1353.7 g |
| Acrylonitrile | 103.8 g |
| Methacrylic acid | 24.5 g |

This emulsion was added in 5 shots to a vessel containing 645 g water and was conducted at 50° C. and polymerized using a redox system consisting of 2.28 g cumene hydroperoxide and 1.54 g sodium sulfoxylate formaldehyde. After completion of the reaction, 78 g of butyleneglycol dimethacrylate was added and polymerized with 1.0 g t-butylhydroperoxide and 0.5 g isoascorbic acid. A sample of the emulsion was precipitated via freezing. The dried sample was milled and pressed into a ⅛" sheet. Other characteristics of the polymer are presented in Example 2.

EXAMPLE 2

Preparation of a Three-Phase Polymer with 15 Parts of a Hard Outer Phase (Tg of Final Phase Ca. 57° C.)

An emulsion was prepared in the same manner as in Example 1 except that a third phase was added in a one-shot mode consisting of 220.2 g methyl methacrylate and 55.1 g butyl acrylate and polymerized with 0.23 g sodium persulfate and 0.23 g sodium formaldehyde sulfoxylate. The precipitated and dried resin was milled and molded as in Expl. 1. The following physical properties were obtained:

| | Tensile Max. kg/cm$^2$ | Elong. at break % | Tg °C. |
|---|---|---|---|
| Expl. 1 | 11.3 | 312 | −26 |
| Expl. 2 | 46.6 | 720 | −24 |

An Instron Tensile Tester was used to measure free-film mechanical properties. Films were cast in polypropylene petri dishes and allowed to dry at least two weeks. The film thickness was 0.09–0.1 cm. If required, films were frozen to separate from the dish and/or talc was applied to facilitate handling. A die was used to cut a dog-bone shaped sample having 0.64 cm width in the thin area. The ends were wrapped with masking tape before being clamped in the Instron jaws.

The following parameters were used in the Instron tester

Crosshead speed: 2.54 cm/min.

Initial gap: 1.27 cm.

In general, samples were run in duplicate.

Data reported are:

Tensile (max.)—the highest strength observed

Tensile (break)—the tensile strength when the sample breaks

Elongation (max.)—the elongation at tensile maximum

Elongation (break)—the elongation when the sample breaks

EXAMPLE 3

A Two-Phase All-Acrylic Polymer with Five Parts of a Highly Crosslinked Second Phase Examples 3 and 4 demonstrate that the presence of a hard thermoplastic outer phase allows achievement of acceptable tensile properties with a first phase having a lower glass temperature. A 5-gallon reactor was charged with 8000 g water and heated to 55° C. A monomer emulsion was prepared in another vessel consisting of: 2250 g water, 390 g Siponate DS-4, 1596 g butyl acrylate, 7286.5 g butyl methacrylate and 142.5 g methacrylic acid. A seed was prepared in situ by adding 583 g of the monomer emulsion and initiating it with 5 g of a 1% aqueous solution of ferrous sulfate, followed by 100 g of a solution of 18 g sodium persulfate in 500 g water and 100 g of a solution of 15 g sodium bisulfite in 500 g water. After the exotherm, the remaining monomer emulsion was added gradually over ca. 2.5 hours together with the remaining solutions of the persulfate and bisulfite maintaining the reaction temperature at 65°±3° C. A 30 min. hold followed the end of feeds, after which the reaction was cooled to 45° C. and 475 g of butyleneglycol dimethacrylate was added followed by solutions of 3.4 g t-butylhydroperoxide in 50 g water and of 2.5 g isoascorbic acid in 50 g water. The reaction was held for 20 minutes after the reaction reached its peak. A sample was precipitated by freezing, washed and dried. The calculated Tg of the first-phase polymer was +1° C.

EXAMPLE 4

A Three-Phase All-Acrylic Polymer with 15 Parts of a Hard Outer Phase

A 5-gallon vessel was charged with 8000 g water and thoroughly deaerated. A monomer emulsion was prepared consisting of 2000 g water, 351.1 g Siponate DS-4, 2422.5 g butyl acrylate, 5531.4 g butyl methacrylate and 121.1 g methacrylic acid. The vessel was heated to 55° C. and a seed was prepared in situ by adding 520 g monomer emulsion and initiating it with 100 g of a solution of 16.15 g of sodium persulfate in 500 g water followed by 100 g of a solution of 13.75 g sodium bisulfite in 500 g water and 5 g of a 1% aqueous of ferrous sulfate. After the exotherm, the remaining monomer emulsion was added gradually over 2 hours together with the remaining solutions of sodium persulfate and sodium bisulfite. The reaction temperature was maintained at 65°±2° C. A hold period of 30 min. followed the end of the feeds after which the reaction was cooled to 45° C., 425 g of butyleneglycol dimethacrylate was added and initiated with solutions of 3 g t-butylhydroperoxide in 50 g water and 2.5 g isoascorbic acid in 50 g water. The reaction was kept for 30 minutes after which 1200 g methyl methacrylate and 300 g butyl acrylate was added and initiated with solutions of 1.5 g sodium persulfate in 75 g water and of 1.25 g sodium formaldehyde sulfoxylate in 75 g water. After a hold of 30 minutes, a sample was precipitated by freezing, washed and dried. The glass temperature of the first-phase polymer was calculated as −9° C. It was noted that films from polymers containing butyl methacrylate in the first phase were less prone to exhibit whitening on exposure to water at temperatures of 70° or above.

The samples of Examples 3 & 4 were milled and molded into ⅛" sheets and the following physical properties were obtained:

| | Tensile kg/cm$^2$ | Elong. at Break % | Tg °C. |
|---|---|---|---|
| Example 3 | 91.0 | 325 | 18 |
| Example 4 | 85.2 | 318 | 6 |

EXAMPLE 5

The Use of the Third Phase Allows One to Improve Both Tensile Strength and Lower the Glass Temperature of the Multi-Phased Polymer A monomer emulsion was prepared consisting of 2241 g water, 64.8 g Siponate DS-10, 5265 g butyl acrylate, 2673 g methyl methacrylate and 162 g of methacrylic acid. A reaction vessel containing 6840 g water was deaerated and a solution of 16.2 g Siponate DS-10 in 54 g water was added. The vessel was heated to 55° C., 728 g of the monomer emulsion prepared above was placed in the reactor and initiated with 90 g of a solution of 16.2 g sodium persulfate in 630 g water, 90 g of a solution of 13.5 g sodium bisulfite in 630 g water and 13 g of a 1% aqueous solution of ferrous sulfate. After the exotherm, the remaining monomer emulsion was added gradually over a 3 hours period together with the remaining solutions of sodium persulfate and sodium bisulfite maintaining the reaction temperature at 65°±2°

C. A ½ hour hold followed the end of feeds after which the reactor was cooled to 45° C., 426 g of butyleneglycol dimethacrylate was added and initiated with solutions of 3 g t-butylhydroperoxide in 45 g water and of 2.2 g isoascorbic acid in 45 g water. After a ½ hour hold, the reaction was cooled. A sample was precipitated by freezing, washed and dried.

EXAMPLE 6

A monomer emulsion was prepared consisting of 2000 g water, 351 g Siponate DS-4, 5650 g butyl acrylate, 2301 g methyl methacrylate and 121 g methacrylic acid. A reaction vessel containing 8000 g water was deaerated with a nitrogen sparge, heated to 55° C. and 520 g of the prepared monomer emulsion was added. It was initiated with 100 g solutions of each, 16.2 g sodium persulfate in 500 g water, 13.7 g sodium bisulfite in 500 g water and with 5 g of a 1% aqueous solution of ferrous sulfate. After the exotherm, the remaining monomer emulsion, persulfate and bisulfite solutions were added gradually over a 2.5 hours period maintaining a reaction temperature of 65°±2° C. A ½ hour hold followed the end of the feeds. The reaction was cooled to 45° C., 425 g of butyleneglycol dimethacrylate was added and initiated with solutions of 3 g t-butylhydroperoxide in 50 g water and of 2.2 g isoascorbic acid in 50 g water. After a hold of 30 minutes, 1200 g methyl methacrylate and 300 g butyl acrylate was added and initiated with aqueous solutions of 1.5 g sodium persulfate and of 1.25 g sodium formaldehyde sulfoxylate. After 30 minutes, the reaction was cooled, a sample was precipitated by freezing, washed and dried. The samples of examples 5 & 6 were milled and molded and the following physical properties were obtained:

| | Tensile, kg/cm$^2$ | Elong. at break, % | Tg. °C. |
|---|---|---|---|
| Example 5 | 54.5 | 535 | 4 |
| Example 6 | 82.3 | 450 | −3 |

EXAMPLE 7

The procedure of Example 1 was followed to prepare an emulsion of butyl acrylate/acrylonitrile/acrylic acid=91.6/7/1.4. The reaction was concluded prior to the addition of any crosslinking monomer. The particle size in Examples 7-10 was set by the addition to the initial aqueous phase of 64 g of a 45% solids seed polymer; said seed polymer was approximately methyl methacrylate/butyl acrylate/methacrylic acid 49/50/1 and of particle size ca. 100 nanometers.

EXAMPLE 8

The procedure of Example 1 was followed to prepare a two-phase polymer of butyl acrylate/acrylonitrile/acrylic acid/butylene glycol dimethacrylate=97(91.6/7/1.4)/3.

EXAMPLE 9

The emulsion of Example 7 (400 parts, 59.7% solids) was further reacted by addition of a monomer emulsion of:

| | Parts |
|---|---|
| Butyl acrylate | 21.1 |
| Methyl methacrylate | 20 |
| Methacrylic acid | 1.05 |

-continued

| | Parts |
|---|---|
| Siponate DS-4 anionic surfactant | 0.19 |
| Water | 10 |

at 50° C., followed by addition of 0.055 parts of t-butyl hydroperoxide and 0.036 parts of isoascorbic acid (as 5% aqueous solutions). The reaction exothermed to 59° C. A second addition of similar amounts of initiator was made in 15 minutes. The resulting solids content was 60.3%. The calculated glass temperature of the outer phase was +4° C. and of the first phase was −47° C.

EXAMPLE 10

The latex of Example 8 (391.5 grams at 61% solids) was treated with the outer phase monomer mix in the proportions and amounts of Example 9 to form a three-phase polymer.

EXAMPLE 11

This example compares the properties of the polymers of Examples 7 to 10 to illustrate the improved balance of properties imparted by the final harder phase. Values of tensile strength and elongation were measured at room temperature.

| Example | phase II, % | phase III, % | Soluble Fraction (%) | Swelling Ratio | Tensile Strength (kg/cm$^2$) | Elongation (%) |
|---|---|---|---|---|---|---|
| 7 | 0 | 0 | 93 | a | 1.5 | 1717 |
| 8 | 3 | 0 | 37 | 22 | 5.9 | 910 |
| 9 | 0 | 15 | 75 | 67 | 13.6 | 1882 |
| 10 | 3 | 15 | 34 | 20 | 26.7 | 1200 |

a = Too lightly crosslinked to measure

EXAMPLE 12

Three-Phase Polymer Useful for Damping in Blends with a Thermosettable Rubber The process of Example 2 was used, except that the ratio of monomers was altered slightly to produce a multi-phase polymer of Phase I/Phase II/Phase III=79.3/4.2/15, wherein Phase I is BA/AN/St/MAA=90.8/7.0/0.6/1.6; Phase II is BGDMA 100; Phase III is MMA/BA=80/20. A small amount of a polymer seed of ca. 80 nm size, composition BA/MMA/AA=49.5/49.5/1, was added prior to the initial polymerization. The resulting latex was coagulated by the techniques taught by Frankel et al cited herein of single-unit coagulation, liquid dewatering, and extrusion, and extruded into 3 mm pellets. Similar results will be obtained if the polymer is coagulated by freezing, washing the gumstock with water, squeezing the gumstock free of water, and drying in vacuo, as the subsequent compounding does not require the thermoplastic elastomeric polymer to be in pellet form.

EXAMPLE 13

This example illustrates the preparation of a three-phase polymer based on a polymer of somewhat higher glass temperature, wherein no seed was employed. The process of Example 2 was used, except that the ratio of monomers was altered slightly to produce a polymer of Phase I/Phase II/Phase III=80.8/4.2/15, wherein Phase I is BA/BMA/MAA=30.0/68.5/1.5; Phase II is BGDMA 100; Phase III is MMA/BA=80/20. The polymer was isolated as in Example 12.

EXAMPLE 14

This example illustrates a polymer similar to that of Example 4 but without a third thermoplastic phase. The process of Example 4 was followed, except the step of polymerizing the third phase was omitted. The polymer was isolated by the method of Example 12. The polymer has a weight ratio of Phase I/Phase II of 95/5; Phase I is BA/BMA/MAA=17.7/80.7/1.6; Phase II is BGDMA 100.

EXAMPLE 15

This example illustrates the preparation of a two-phase polymer of Tg ca. 25° C. The process of Example 4 was followed, except the step of polymerizing the third phase was omitted. The polymer was isolated by the method of Example 12. The polymer has a weight ratio of Phase I/Phase II of 95/5; Phase I is BA/MMA/MAA=50.0/48.5/1.5; Phase II is BGDMA 100.

EXAMPLE 16

The process of Example 15 was repeated to yield a two-phase polymer of Tg ca. 0° C. The polymer has a weight ratio of Phase I/Phase II of 95/5; Phase I is BA/MMA/MAA=65.0/33.0/2.0; Phase II is BGDMA 100.

EXAMPLE 17

This example illustrates the damping properties of the two- and three-phase polymers of the previous examples. Materials from certain of the above preparations after isolation by either precipitation or extruder coagulation were processed into appropriate test specimens by pressing in a Carver press between Mylar polyester spacers at 180° C. platen temperature for 2 to 3 minutes at $1.38\times10^9$ dynes/square cm (piston pressure), then cooling to 15° C. and pressing for 4 to 5 minutes at $6.9\times10^8$ dynes/square cm (piston pressure). Spacer plates were used to obtain thicknesses of 3.175 mm for dynamic mechanical testing or 0.51 mm for tensile and elongation testing. Room temperature tensile properties were determined to show that acceptable strength and elongation were obtained, and that the degree of tension set or physical recovery was not excessive. The glass temperature was determined by differential scanning calorimetry.

The dynamic mechanical values are measured on a Rheometrics Dynamic Spectrometer (Rheometrics Instruments, Piscataway, N.J.), equipped with rectangular tooling torsion fixtures. Samples of the acrylic two- or three-phase polymer are compression molded and cut into strips of 63.5 mm length by 12.7 mm wide by 3.2 mm thickness. The sample is dried overnight at 60° C. in vacuo, and then affixed to the jaws of the spectrometer. The sample is cooled to −140° C. A maximum strain of only 0.4% is utilized until the test temperature is above that of the onset of rubbery properties; at no time does the maximum strain exceed 10%. Measurements are made at 20° C. intervals over a frequency sweep of 0.1 to 200 radians/second. The maximum temperature may be as high as 140° C. but usually these polymers begin to exhibit obvious viscous flow at the highest temperature and the geometry is not maintained.

The plots obtained of tan δ vs. frequency at each temperature are then superimposed, utilizing the Williams-Landel-Ferry equation (J D Ferry, Viscoelastic Properties of Polymers, Chapter 13, John Wiley and Sons, New York, 3rd edition, 1980). From the master plot of tan δ vs. log frequency is determined the frequency range in decades over which tan δ exceeds 0.4.

| Polymer of Example | Tg, °C. | Strength, kiloPascals | Tensile Elongation % | Maximum Tan δ | Range Decades |
|---|---|---|---|---|---|
| 12 | −20 | 6900 | 800 | 0.8 | 4 |
| 13 | +5 | 7280 | 300 | 0.8 | 4 |
| 14 | +20 | 9660 | 300 | 1.4 | 6 |
| 15 | 0 | 4800 | 500 | 1.4 | 6 |

EXAMPLE 18

This example illustrates the excellent damping behavior and fatigue life of three compositions, A, B, and C, made according to the invention as compared to those of a composition D, which was not made according to the invention. Compositions A, B, and C comprise the two-phase acrylic thermoplastic elastomeric polymers from Examples 15, 16, and 14, respectively, incorporated in the thermosettable elastomer formulation shown below. In these formulations, the two-phase acrylic thermoplastic elastomeric polymers above were used as the additive polymer and X=60. The reference composition D incorporates polyisobutylene (IM) as the additive polymer and X=20. Phr=parts per hundred of cross-linkable elastomer.

TABLE 18-1

| Composition Formulation | |
|---|---|
| Material | phrNR |
| SMR-L (Natural Rubber) | X |
| Bromobutyl Rubber | 100-X |
| Additive Polymer | 20 |
| Carbon Black (N-660) | 35 |
| Stearic Acid | 2 |
| Zinc Oxide | 5 |
| Paraffinic Petroleum Oil ASTM Type 104B | 5 |
| Diphenylamine Derivative | 1.5 |
| 2- and 3-Methyl Mercaptobenzimidazole | 1.5 |
| Thiocarbamyl Sulfenamide | 1.20 |
| N-Oxydiethylene Benzothiazole 2-Sulfenamide | .55 |
| Elemental Sulfur | 0.40 |

The first three ingredients (the polymeric components) were combined and mixed in a laboratory-size (model BR) Banbury mixer for 1.5 minutes. The remaining ingredients exclusive of accelerators and sulfur were added in two portions and the mixture masticated for a total of 6.0 minutes. It was then dumped from the Banbury, sheeted with a rubber mill, and allowed to cool. Curatives (accelerators and sulfur) were subsequently added to 550 g. of the mixture on a rubber mill according to ASTM D3182, with no pre-conditioning of the carbon black.

The materials were molded according to ASTM D3182 and cured to 100% optimum as determined by Monsanto oscillating disc rheometer. Cure temperatures were varied for different moldings of the same formulation to optimize fatigue properties. The cure temperatures listed in Table I were optimal for each formulation.

Ultimate tensile strength and elongation at break were determined under ambient conditions according to ASTM D412 (die C) and tear strength according to ASTM D624 (die B). An electromechanical tester was used at a test speed of 500 mm per minute.

Compression set testing was done according to ASTM D395 (method B). The test specimens were held under 25% compression for 22 hours at 125° C. in ventilated, air-circulating oven, and a 30 minute relaxation at room temperature was allowed before taking final measurements. Testing for mechanical fatigue was conducted either as taught by Tabar (more fully described by Lemieux et al.), or by test method ASTM D4482-85 using a Monsanto fatigue-to-failure tester.

Dynamic-mechanical properties including tan δ and glass transition temperature (Tg) were determined on a Polymer Laboratories DMTA. Isochronal (10 Hz) data was collected in simple tension from −100° to 100° C., at a strain displacement of 62 microns, and a heating rate of 2° C./minute. Isothermal data was collected on simple shear specimens over frequencies of 0.01–100 Hz at 20° C. intervals from −20° to 100° C.

TABLE 18-2

| Composition | Additive Polymer | Cure Temperature, °C. |
|---|---|---|
| A | Example 15 | 140 |
| B | Example 16 | 140 |
| C | Example 14 | 140 |
| D | IM | 170 |

The compositions containing the two-phase acrylic thermoplastic elastomers have comparable or improved fatigue resistance compared to the reference composition containing polyisobutylene. The comparison of log (fatigue life), as cycles, against log (strain energy) ($mJ/mm^3$) was plotted, and the numbers in Table 18-3 were derived using linear regression. All three of the compositions according to this invention (A, B, and C) have improved fatigue resistance over the reference composition (D) at test energies up to 630 $mJ/mm^3$. The composition containing the additive polymer from Example 16 had the best fatigue life over the entire range of the test.

TABLE 18-3

Fatigue Resistance of Blends A, B, C, and D

| Strain Energy $mJ/mm^3$ | Log Fatigue Life, cycles A | B | C | D |
|---|---|---|---|---|
| 400 | — | 5.75 | 5.63 | 5.56 |
| 600 | 5.75 | 5.46 | 5.31 | 5.30 |
| 700 | 5.40 | 5.35 | 5.19 | 5.21 |
| 1000 | 5.26 | 5.10 | 4.80 | 4.98 |
| 1150 | 4.83 | 5.00 | 4.80 | 4.89 |
| 1400 | 4.67 | 4.86 | 4.65 | 4.77 |

The isochronal (10 Hz) tan δ/temperature response for these compositions are presented in Table 18-4. All three compositions according to the invention display more uniform damping behavior over the temperature range of −50° to −20° C. as compared to that of the reference composition. Also, the same three formulations, A, B, and C, provide much improved damping behavior over that of the reference composition in the temperature range from 0° to 20° C., especially so for formulations B and C.

TABLE 18-4

Isochronal Damping Response for Compositions A, B, C, and D

| Temperature, °C. | tan δ for Compositions A | B | C | D |
|---|---|---|---|---|
| −55 | 0.28 | 0.24 | 0.43 | 0.46 |
| −50 | 0.55 | 0.52 | 0.63 | 0.92 |
| −40 | 0.83 | 0.69 | 0.64 | 0.97 |
| −20 | 0.71 | 0.57 | 0.53 | 0.69 |
| 0 | 0.31 | 0.32 | 0.30 | 0.30 |
| +20 | 0.17 | 0.30 | 0.29 | 0.14 |

This improved damping behavior was confirmed using ambient response of the formulations. Table 18-5 is taken from the experimental plot of tan δ/log frequency (Hz).

TABLE 18-5

Damping Response for Compositions A, B, C, and D at Various Frequencies at T = 20° C.

| Frequency, Hz | tan δ for Compositions A | B | C | D |
|---|---|---|---|---|
| 0.01 | 0.15 | 0.12 | 0.16 | 0.08 |
| 0.10 | 0.11 | 0.15 | 0.18 | 0.07 |
| 1.0 | 0.10 | 0.17 | 0.18 | 0.08 |
| 10.0 | 0.16 | 0.21 | 0.22 | 0.14 |
| 50.0 | 0.28 | 0.31 | 0.29 | 0.26 |

It was also found that inclusion of the multi-phase acrylic elastomers in the compositions imparts higher values of tan δ over a wide range of test frequencies. At 80° C. similar behavior is observed, except at the very low frequencies where tan δ is nearly the same for all formulations.

TABLE 18-6

Damping Response for Compositions A, B, C, and D at Various Frequencies at T = 80° C.

| Frequency, Hz | tan δ for Compositions A | B | C | D |
|---|---|---|---|---|
| 0.10 | 0.09 | 0.10 | 0.09 | 0.08 |
| 1.0 | 0.09 | 0.10 | 0.09 | 0.07 |
| 10.0 | 0.11 | 0.10 | 0.11 | 0.07 |
| 50.0 | 0.16 | 0.12 | 0.15 | 0.09 |
| 100.0 | 0.19 | 0.15 | 0.19 | 0.11 |

Table 18-7 is a comparison of the physical properties of the compositions. The effect of varying the additive polymer is negligible, except for a slight lowering of the tensile strength for Sample A and a slight improvement in compression set for Sample C.

TABLE 18-7

Physical Property Comparison

| Sample | Tensile (MPa) | Elongation % | Tear Strength | % Compression Set |
|---|---|---|---|---|
| A | 15.0 | 548 | 53.1 | 36.5 |
| B | 17.4 | 598 | 56.4 | 34.6 |
| C | 17.3 | 613 | 60.8 | 33.4 |
| D | 18.2 | 680 | 54.8 | 35.4 |

EXAMPLE 19

This example illustrates the excellent damping behavior and fatigue life of a composition E made according to the invention as compared to that of composition D, the reference composition made in Example 18. Composition E comprises the three-phase acrylic thermoplastic elastomer from Example 12 in the thermosettable elastomer formulation shown in Example 18. The three-phase acrylic polymer was incorporated as the additive polymer with X=60. Sample E was mixed and molded according to the procedure of Example 18 and cured at a cure temperature of 170° C. A comparision of the isochronal tan δ behavior for the two formulations is shown below. As can be seen from these data, composition E which comprises the three-phase acrylic polymer displayed a more uniform damping response as compared to that of reference composition D over the temperature range of −50° to −20° C., and surpassed the damping of reference composition D over the range of −15° to 20° C.

TABLE 19-1

Isochronal Damping Response for Compositions D and E

| Temperature, °C. | tan δ for Compositions | |
|---|---|---|
| | D | E |
| −55 | 0.46 | 0.40 |
| −50 | 0.92 | 0.66 |
| −40 | 0.97 | 0.68 |
| −20 | 0.69 | 0.56 |
| 0 | 0.30 | 0.37 |
| +30 | 0.14 | 0.17 |

EXAMPLE 20

This example illustrates the expected excellent physical properties of a composition according to this invention. The composition is made according to the formulation and procedure of Example 18 except that the bromobutyl rubber is replaced by 25 phr of polybutadiene rubber (BR). This composition includes a multi-phase acrylic thermoplastic elastomer, such as taught in Example 16. The heat-aged physical properties of this formulation would be expected to be superior to those of typical NR damping materials due to the inclusion of the polybutadiene rubber in the composition. Tabar et al in U.S. Pat. No. 4,362,840 disclosed the improvement of heat aging properties afforded elastomeric compositions of NR, BR and IM. The improved damping behavior of examples 18 and 19 over formulations containing IM is fully expected to be analogous to this example, and should provide an advantage in applications where higher heat resistance is necessary. Due to the thermoplastic nature of the multi-phase acrylic polymers, and therefore the lower viscosity relative to most elastomers under high-shear mixing temperatures, the fatigue-resistance-enhancing discrete particle morphology will be present in this formulation.

EXAMPLE 21

This example makes a direct comparison between a composition utilizing a multi-phase acrylic elastomer as the additive polymer and a compositionally analogous formulation utilizing IM as the additive polymer. Sample B, previously described, was used as the composition containing the multi-phase acrylic elastomer. Sample F was prepared with IM as the additive polymer in the formulation of Example 18-1 with X=40 and Y=20, and cured at 170° C.

Dynamic measurements were taken with a Rheometrics RMS 800 mechanical spectrometer at 25° C. and 100° C. using the parallel plate geometry. Data was collected and recorded at rates from 1 to 100 radians/sec., and the samples were placed under 15% compression to prevent slipping.

Values from the plotted data are shown in Table 21-1. Sample B exhibits an improved tan δ response over the entire range of frequencies in comparison with the prior art sample, and the trend is maintained at high temperature.

TABLE 21-1

Comparison of Damping Behavior of Composition Containing Multi-Phase Acrylic Polymer with One Containing Isobutylene Polymer

| Rate of Measurement radians/sec. | Damping (tan δ) of Formulated/Cured Compounds | | | |
|---|---|---|---|---|
| | B, 25° | F, 25° | B, 100° | F, 100° |
| 1 | 0.22 | 0.21 | 0.14 | 0.14 |
| 6 | 0.26 | 0.22 | 0.15 | 0.13 |
| 10 | 0.27 | 0.22 | 0.15 | 0.13 |
| 22.5 | 0.31 | 0.24 | 0.15 | 0.12 |
| 40 | 0.33 | 0.25 | 0.15 | 0.12 |
| 60 | 0.36 | 0.27 | 0.15 | 0.12 |
| 100 | 0.39 | 0.30 | 0.15 | 0.12 |

While the invention has been described with reference to specific examples and applications, other modifications and uses for the invention will be apparent to those skilled in the art without departing from the spirit and scope of the invention defined in the appended claims.

We claim:

1. A composition useful for damping purposes comprising:
   (a) crosslinked elastomer containing microscopically discrete segments of
   (b) multi-phase thermoplastic elastomeric polymer having at least two polymeric phases comprising:
      (1) an initial linear or lightly crosslinked polymeric phase polymerized from an alpha, beta-unsaturated monomer, wherein said alpha,beta-ethylenically unsaturated monomer comprises from 0 to about two percent by weight of multi-ethylenically unsaturated monomer,
      (2) a second polymeric phase in the form of discrete domains of about 2 to about 50 nanometers in diameter dispersed within said initial polymeric phase, wherein said second polymeric phase is polymerized from at least one ethylenically unsaturated monomer comprised of about 5 percent to 100 percent by weight multifunctional monomer having at least two sites of ethylenic unsaturation,
   wherein the weight ratio of said second polymeric phase to said initial polymeric phase plus said second polymeric phase is from about 1:100 to about 1:2.

2. The composition of claim 1 wherein said multi-phase thermoplastic polymer further comprises a final polymeric thermoplastic phase whose glass temperature is greater than that of said initial polymeric phase, a portion of said final polymeric phase being intimately attached to at least one of said initial and said second polymer phases, and the weight ratio of said final polymeric phase to said initial polymeric phase plus said second polymeric phase plus said final polymeric phase is up to about 1:5.

3. The composition of claim 1 further including reinforcing particulate filler, wherein the ratio of said reinforcing particulate filler to said crosslinked elastomer plus said multi-phase polymer plus said reinforcing particulate filler is up to about 1:25.

4. The composition of claim 1 wherein said crosslinked elastomer is selected from the group consisting essentially of natural rubber, synthetic polyisoprene rubber, elastomeric butadiene, and bromobutyl rubber.

5. The composition of claim 4 further including reinforcing particulate, the ratio of said reinforcing particulate filler to said crosslinked elastomer plus said multiphase polymer plus said reinforcing particulate filler is up to about 1:25.

6. The composition of claim 5 wherein said composition comprises as said crosslinked elastomer a blend of said polyisoprene and said bromobutyl rubber in a weight ratio of from about 100:1 to about 0.65:1, said crosslinked elastomer being crosslinked by a curative comprising a curing agent selected from the group consisting of sulfur, isocyanate, and blocked isocyanate, and said reinforcing particulate filler being carbon black.

7. A process for damping comprising:

(a) blending (i) a crosslinkable elastomer;

(ii) a multi-phase thermoplastic elastomeric polymer having at least two polymeric phases comprising:

(1) an initial linear or lightly crosslinked polymeric phase polymerized from an alpha,beta-ethylenically unsaturated monomer wherein said alpha,beta-ethylenically unsaturated monomer comprises from 0 to about two percent by weight of multi-ethylenically unsaturated monomer, (2) a second polymeric phase in the form of discrete domains of about 2 to about 50 nanometers in diameter dispersed within said initial polymeric phase, wherein said second polymeric phase is polymerized from at least one ethylenically unsaturated monomer comprised of about 5 percent to 100 percent by weight multifunctional monomer having at least two sites of ethylenic unsaturation, wherein the weight ratio of said second polymeric phase to said initial polymeric phase plus said second polymeric phase is from about 1:100 to about 1:2;

(iii) at least one curative and optionally one or more reinforcing particulate fillers, wherein the ratio of said optional reinforcing particulate filler to said crosslinkable elastomer plus said multiphase polymer plus said reinforcing particulate filler is up to about 1:2.5;

(b) molding said resultant blend;

(c) curing said blend to form a crosslinked elastomer containing microscopically discrete segments of said multi-phase polymer, (d) placing said cured molded blend between two surfaces, at least one of which is subject to vibrations, and damping said vibrations.

8. The process of claim 7 wherein said multi-phase polymer further comprises a final polymeric thermoplastic phase whose glass temperature is greater than that of said initial polymeric phase, a portion of said final polymeric phase being intimately attached to at least one of said initial and said second polymer phases, and the weight ratio of said final polymeric phase to said initial polymeric phase plus said second polymeric phase plus said final polymeric phase is up to about 1:5.

9. The process of claim 7 or 8 wherein said crosslinkable elastomer is a blend of polyisoprene and bromobutyl rubber in a weight ratio of from about 100:1 to about 0.65:1, said curative comprises a curing agent selected from the group consisting of sulfur, isocyanate, and blocked isocyanate, and the blend to be cured further contains a reinforcing particulate filler, wherein the ratio of said reinforcing particulate filler to said crosslinkable elastomer plus said multi-phase polymer plus said reinforcing particulate filler is up to about 1:2.5.

10. The process of claim 9 wherein the reinforcing particulate filler is carbon black.

* * * * *

UNITED STATES PATENT AND TRADEMARK OFFICE
CERTIFICATE OF CORRECTION

PATENT NO. : 5,008,324

DATED : Apr. 16, 1991

INVENTOR(S) : Killgoar, Jr. et al.

It is certified that error appears in the above-identified patent and that said Letters Patent is hereby corrected as shown below:

On the cover page, after "[73] Assignee: Rohm and Haas Company
Philadelphia, Pa."

insert --Ford Motor Company
Dearborn, MI.--

Signed and Sealed this

Twenty-ninth Day of September, 1992

Attest:

DOUGLAS B. COMER

Attesting Officer

Acting Commissioner of Patents and Trademarks